United States Patent [19]

Cucheran

[11] Patent Number: 5,090,605
[45] Date of Patent: Feb. 25, 1992

[54] SLAT ASSEMBLY FOR VEHICLE ARTICLE CARRIERS

[75] Inventor: John S. Cucheran, Lake Orion, Mich.

[73] Assignee: John A. Bott, Grosse Pointe Shores, Mich.

[21] Appl. No.: 609,822

[22] Filed: Nov. 6, 1990

[51] Int. Cl.⁵ .............................................. B60R 9/04
[52] U.S. Cl. ..................... 224/321; 224/309; 224/322; 224/326; 296/37.7
[58] Field of Search ............... 296/37.7; 224/309, 310, 224/321, 322, 324, 330, 329, 331, 325, 326

[56] References Cited

U.S. PATENT DOCUMENTS

| | | | |
|---|---|---|---|
| 4,099,658 | 7/1978 | Bott | 296/37.7 X |
| 4,264,025 | 4/1981 | Ferguson et al. | 224/321 |
| 4,266,708 | 5/1981 | Bott | 224/324 X |
| 4,473,178 | 9/1984 | Bott | 224/324 |
| 4,487,349 | 12/1984 | Kudo | 224/322 |
| 4,684,048 | 8/1987 | Bott | 224/324 X |
| 4,768,691 | 9/1988 | Stapleton | 224/325 X |
| 4,883,208 | 11/1989 | Bott | 296/37.7 X |
| 4,911,348 | 3/1990 | Rasor et al. | 224/321 |
| 5,004,139 | 4/1991 | Storm et al. | 224/330 X |
| 5,007,570 | 4/1991 | Himmel | 224/326 X |

Primary Examiner—Margaret A. Focarino
Assistant Examiner—Joseph D. Pape
Attorney, Agent, or Firm—Harness, Dickey & Pierce

[57] ABSTRACT

The present invention is a slat for a vehicle article carrier adapted to be mounted in a longitudinally extending recess in a generally horizontal extending exterior vehicle body surface. The slat includes a channel member adapted to be disposed in the recess. The channel member has an upper surface adapted to be disposed substantially flush with the vehicle body surface.

25 Claims, 2 Drawing Sheets

SLAT ASSEMBLY FOR VEHICLE ARTICLE CARRIERS

SUMMARY OF THE INVENTION

The present invention is a slat assembly for a vehicle article carrier adapted to be mounted in a longitudinally extending recess in a generally horizontal extending exterior surface portion. The slat assembly includes means forming a channel member adapted to be disposed within the recess. The channel member has an upper surface. The slat assembly includes means for varying a vertical height of the upper surface relative to the surface portion such that the upper surface is substantially flush with the surface portion.

One advantage of the present invention is that a slat is provided which is easy to assemble. Another advantage of the present invention is that the slat is more aesthetically pleasing and does not extend noticeably above the vehicle body surface. Yet another advantage of the present invention is that the slat can be mounted substantially flush with the vehicle body surface. A further advantage of the present invention is that the slat forms a channel for allowing a crossbar to be locked or secured in place along the slat.

Other objects, features and advantages of the present invention will be readily appreciated as the same becomes better understood when viewed in light of the following description and accompanying drawings.

DESCRIPTION OF THE PREFERRED EMBODIMENT(S)

Figure 1:
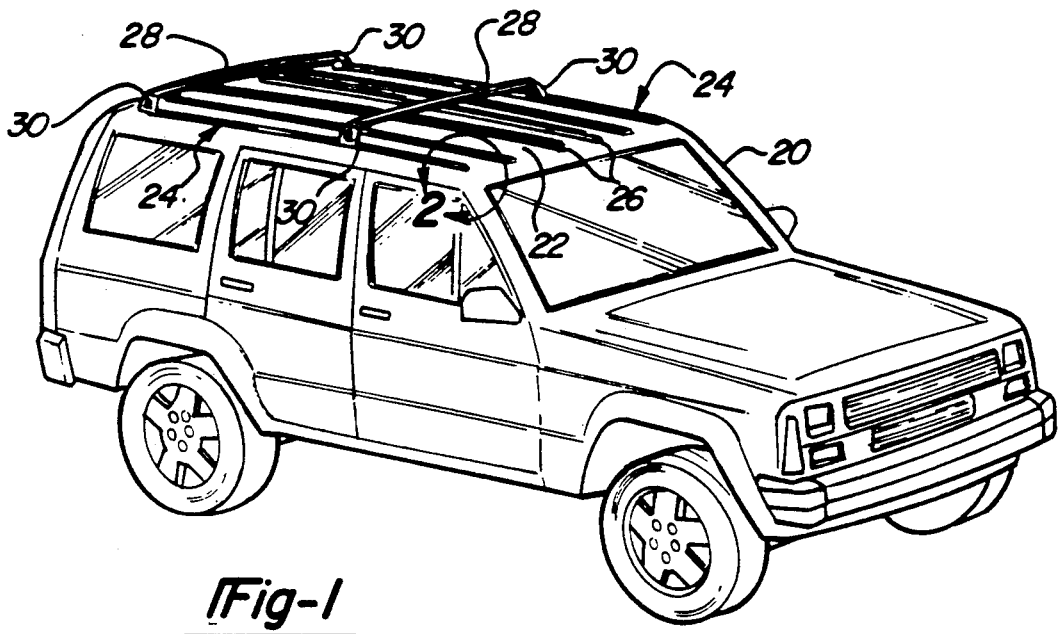
FIG. 1 is a perspective view of a vehicle illustrating an article carrier mounted thereon which is constructed in accordance with the principles of the present invention.

FIG. 1 depicts a vehicle 20 such as an automobile having a generally horizontal roof 22 on which are mounted a pair of identical, parallel, transversely spaced side rails, slats or slat assemblies, generally indicated at 24. Although the slat assemblies 24 are shown mounted on the roof 22, the slat assemblies 24 of the present invention which form an article carrier may be mounted with equal utility on a trunk lid or any other generally horizontal exterior body portion of the vehicle 20. Mounted on the roof 22 are a plurality of identical, parallel, transversely spaced support slats 26. The support slats 26 are disposed between the slat assemblies 24 such that the support slats 26 are transversely spaced between the slat assemblies 24. The slat assemblies 24 and support slats 26 may be secured on the roof 22 by means such as sheet metal screws (not shown), pop rivets, rivet nuts or the like.

Mounted on the slat assemblies 24 are a pair of raised tubular restraining bars or crossbars 28 which are fitted at their opposite ends onto stanchions, bracket members or brackets 30. The brackets 30 include a locking structure (not shown) for locking the crossbars 28 into position along the slat assemblies 24. The locking structure may comprise a clamp lock with an adjustable wheel, a pin lock into apertures of the slat assemblies 24, or a clamp disposed within the slat assemblies 24. The locking structure allows the crossbars 28 to be positioned operably at any location or at predetermined locations along the length of the slat assemblies 24.

Figure 2:
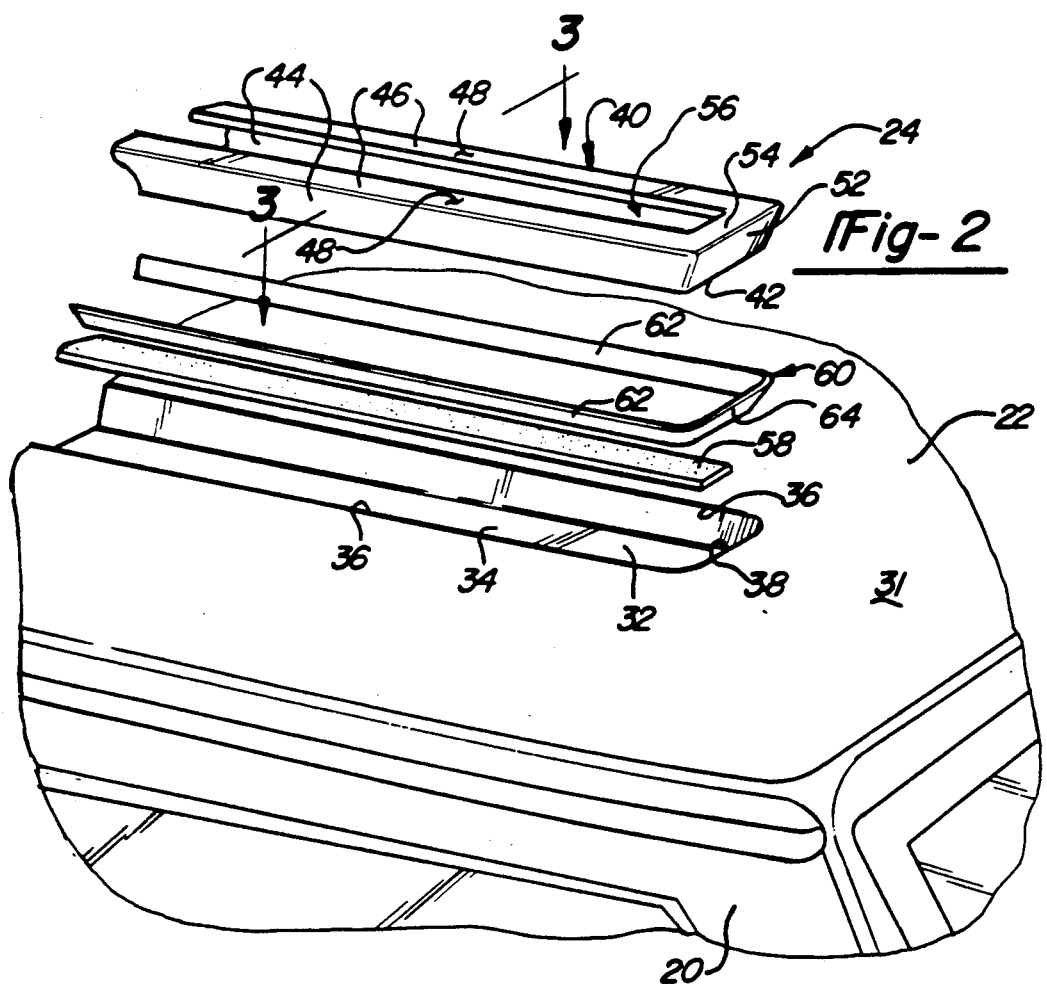
FIG. 2 is an enlarged perspective view of a portion of the structure illustrated in circle 2 for the article carrier of FIG. 1.
Figure 3:
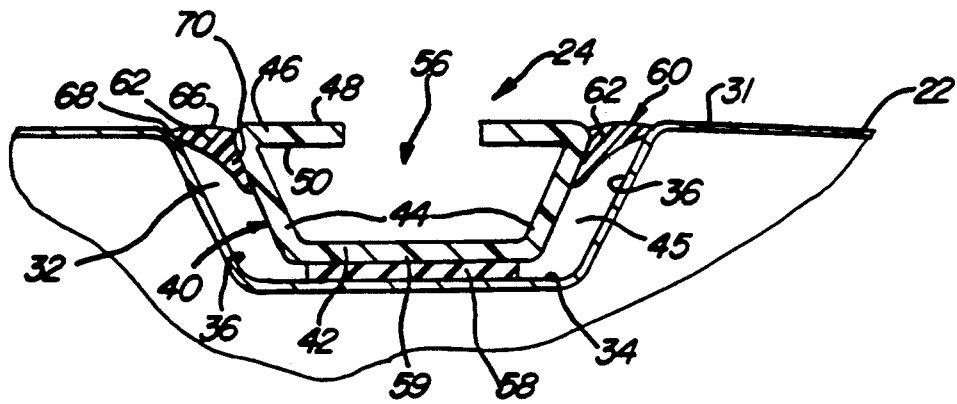
FIG. 3 is a sectional view of the structure illustrated in FIG. 2 taken along line 3—3 thereof.

Referring to FIGS. 2 and 3, only a portion of the slat assembly 24 and roof 22 are illustrated. The roof 22 has a vehicle body surface 31 including a plurality of transversely spaced and inwardly directed recesses 32. Preferably, the vehicle body surface 31 has a pair of recesses 32 with each recess 32 being disposed near the outermost side of the roof 22. Each recess 32 extends generally longitudinally along the vehicle body surface 31 and is defined by a bottom surface 34 being generally horizontal and a pair of side surfaces 36 and end surfaces 38 extending upwardly from edges of the bottom surface 34 at an angle or incline to the vehicle body surface 31. It should he appreciated that the surface 34,36 and 38 are integral and may form a weld ditch of the roof 22.

The slat assembly 24 includes a channel member, generally indicated at 40, which extends generally longitudinally and is adapted to be received in each recess 32. The channel member 40 includes a generally horizontal bottom wall 42 and a pair of generally inclined upwardly and outwardly extending side walls 44. The bcttom wall 42 has a transverse width less than a transverse width of the bottom surface 34 of the recess 32 to form a transverse space 45 between the side walls 44 and side surfaces 36 of the recess 32. The channel member 40 also includes generally horizontal side ledges 46 extending inwardly at the upper ends of the side walls 44. The side ledges 46 include an outer article supporting surface 48 and an inner upper surface 50 spaced generally vertically below the article supporting surface 48. The channel member 40 further includes a generally inclined end Wall 52 extending upwardly and Outwardly at an angle from a longitudinal end of the bottom wall 42 and a generally horizontal end ledge 54 extending longitudinally from the end wall 52. The end ledge 54 includes an outer article supporting surface 48 and an inner upper surface (not shown). The bottom wall 42 and side walls 44 and ledges 46 form an upwardly opening channel 56 which is wider at its bottom than at the top and closed at the longitudinal end by end wall 52 and ledge 54. It should be appreciated that the bottom wall 42, side walls 44 and ledges 46 are integral. It should also be appreciated that the article supporting surfaces 48 extend generally in the same plane. It should further be appreciated that the bottom wall 42 terminates before the end surface 38 to form a longitudinal space between the end wall 52 and end surface 38.

The slat assembly 24 may include an elastomeric mounting pad 58 interposed between the bottom surface 34 of the recess 32 and a lower surface 59 of the bottom wall 42 of the channel member 40. The mounting pad 58 is generally planar and extends longitudinally. Preferably, the mounting pad 58 has a transverse width less than a transverse width of the bottom wall 42. The thickness or height of the mounting pad 58 may be varied such that the inner upper surface 50 is substantially flush with the vehicle body surface 31. As illustrated in FIG. 3, the inner upper surface 50 is disposed slightly below the vehicle body surface 31. It should be appreciated that the side walls 44 may have a vertical height less than, substantially flush or greater than a vertical height of the side surfaces 36.

The slat assembly 24 may include a sealing strip, generally indicated at 60, disposed between the side surfaces 36 of the recess 32 and the side walls 44 of the channel member 40 and between the end surfaces 38 and end walls 52 thereof. As illustrated in FIG. 2, the sealing strip 60 includes side portions 62 extending longitudinally to close or seal the transverse space 45 and an end portion 64 extending transversely to close or seal a longitudinal space between the channel member 40 and recess 32. As illustrated in FIG. 3, the side portions 62 have a top surface 66, an outer surface 68 and an inner surface 70. The top surface 66 is adapted to be substantially flush with vehicle body surface 31 and the article supporting surface 48. The outer surface 68 is adapted to engage the intersection of the vehicle body surface 31 and side surface 36 of the recess 32 and the inner surface 70 is adapted to engage the upper end of the side walls 44 of the channel member 40. The inner surface 70 extends downwardly and partially along the side wall 44. Preferably, the sealing strip 60 is made of an elastomeric material and frictionally secured between the recess 32 and channel member 40. The sealing strip 60 is to prevent foreign matter such as dirt, water or the like from entering the recess 32. The sealing strip 60 also provides an aesthetic appearance.

Figure 4:
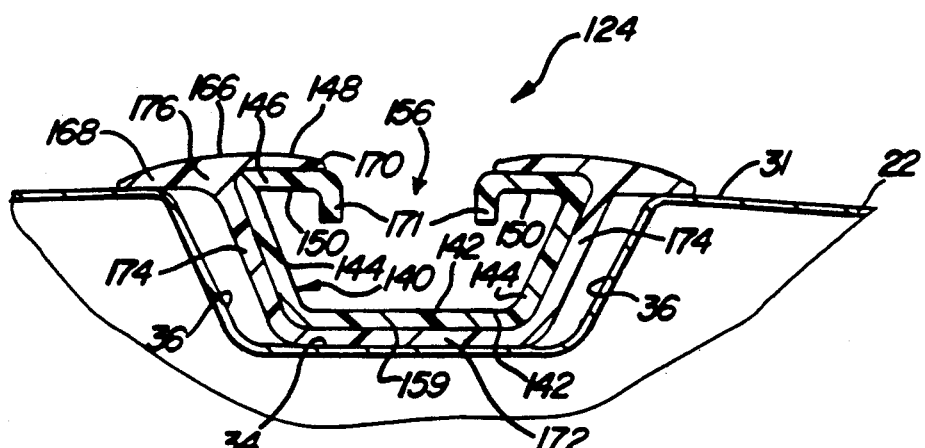
FIG. 4 is a view of the structure similarly illustrated in FIG. 3.

Referring to FIG. 4, an alternate embodiment 124 of the slat assembly 24 according to the present invention is shown. Like parts of the slat assembly 24 have like numerals increased by one hundred (100). The channel member 140 includes a downwardly and generally vertical extending flange or lip 171 at the inner or free end of each side ledge 146. The flange 171 may include a plurality of notches (not shown) defined therein and spaced along the longitudinal length thereof. The slat assembly 124 may eliminate the separate mounting pad 58 by incorporating it as a bottom portion 172 of the sealing strip 160. The thickness or height of the bottom portion 172 may be varied such that the inner upper surface 150 is flush with the vehicle body surface 31.

The bottom portion 172 extends transversely and longitudinally along the bottom wall 142. The sealing strip 160 includes generally inclined upwardly extending side sections 174 from the bottom portion 172 extending along the side walls 144 and cap portions 176 at the upper end of the side sections 174. The cap portions 176 include the top surface 166 which extends transversely such that the outer surface 168 overlaps the vehicle body surface 31 and the inner surface 170 overlaps the article supporting surface 48. It should be appreciated that the bottom portion 172, side sections 174 and cap portions 176 are integral and frictionally fit about the channel member 140.

Figure 5:
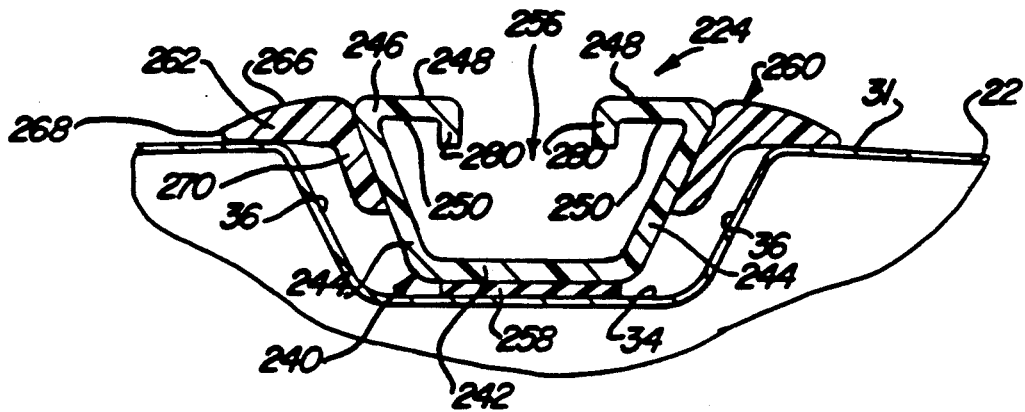
FIG. 5 is a view of the structure similarly illustrated in FIGS. 3 and 4.

Referring to FIG. 5, an alternate embodiment 224 of the slat assembly 24 according to the present invention is shown. Like parts of the slat assembly 24 have like numerals increased by two hundred (200). The channel member 240 has a downwardly and generally vertical extending flanges or lip 280 at the inner or free end of each ledge 246. The flange 280 may include a plurality of notches (not shown) defined therein and spaced along the longitudinal length thereof. The sealing strip 260 includes the top surface 266 which is adapted to extend transversely substantially flush with the article supporting surface 248 at the inner surface 270 and to overlap the vehicle body surface 36 at the outer edge 268. The inner surface 270 is adapted to engage the upper end of the side wall 244 and extend downwardly partially therealong. The slat assembly 224 includes the mounting pad 258 having a thickness or height which may be varied such that the inner upper surface 250 is disposed slightly above the vehicle body surface 31.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A slat assembly operable to be mounted in a longitudinally extending recess in a surface portion of a vehicle, comprising:

means forming a channel member disposed within the recess, said channel member having an upper surface; and means for setting a vertical height of said upper surface relative to the surface portion such that said upper surface is substantially flush with the surface portion of the vehicle.

2. A slat assembly as set forth in claim 1 wherein said channel member comprises a bottom wall, a pair of side walls extending upwardly from said bottom wall, and ledges extending inwardly from said side walls which terminate to define a channel, said ledge including said upper surface.

3. A slat assembly as set forth in claim 2 wherein said ledge has an article supporting surface and said upper surface spaced generally vertically from said article supporting surface.

4. A slat assembly as set forth in claim 3 wherein said setting means comprises a selected one of a plurality of mounting pads, said mounting pads having varying thicknesses, said selected one of said mounting pads being disposed between said bottom wall of said channel member and a bottom surface of the recess to thereby selectively set said vertical height of said upper surface relative to the surface portion.

5. A slat assembly as set forth in claim 4 wherein said mounting pad has a transverse width less than a transverse width of said bottom wall.

6. A slat assembly as set forth in claim 1 wherein said upper surface is flush with the surface portion of the vehicle.

7. A slat assembly as set forth in claim 1 wherein said upper surface comprises an inner upper surface, said inner upper surface being disposed below the surface portion of the vehicle.

8. A slat assembly as set forth in claim 1 wherein said upper surface is disposed above the surface portion of the vehicle.

9. A slat assembly as set forth in claim 2 including sealing means for sealing a space between the recess and said channel member.

10. A slat assembly as set forth in claim 9 wherein said sealing means comprises side portions extending longitudinally and an end portion extending transversely between said side portions at each end thereof.

11. A slat assembly as set forth in claim 10 wherein said side portions have an outer surface, an inner surface, and a top surface extending transversely between said outer surface and said inner surface.

12. A slat assembly as set forth in claim 11 wherein said inner surface engages said side wall and extends downwardly and partially therealong.

13. A slat assembly as set forth in claim 12 wherein said top surface is substantially flush with the surface portion and said ledge.

14. A slat assembly as set forth in claim 12 wherein said outer surface overlaps the surface portion.

15. A slat assembly as set forth in claim 11 wherein said sealing means further comprises a bottom portion extending along said bottom wall and side sections extending along said side walls, said top, inner and outer surfaces of said side portions of said sealing means further forming cap portions at upper ends of said side walls.

16. A slat assembly as set forth in claim 15 wherein said outer surface overlaps the surface portion and said inner surface overlaps said ledge.

17. A slat assembly operable to be mounted in a longitudinally extending recess in a surface portion of a vehicle, comprising:
a channel member disposed within the recess, said channel member including a bottom wall, a pair of side walls extending upwardly from said bottom wall, and ledges extending inwardly from said side walls which terminate to define a channel, said ledges including an article supporting surface and an inner upper surface spaced generally vertically from said article supporting surface; and
a mounting pad disposed between said bottom wall of said channel member and a bottom surface of the recess for setting a vertical height of said inner upper surface relative to the surface portion such that said inner upper surface is substantially flush with the surface portion of the vehicle.

18. A slat assembly as set forth in claim 17 including a seal for sealing a space between the recess and said channel member, said seal having an outer surface, inner surface, and a top surface extending transversely between said outer surface and said inner surface.

19. A slat assembly as set forth in claim 18 wherein said inner surface engages said side wall and extends downwardly and partially therealong.

20. A slat assembly as set forth in claim 19 wherein said top surface is substantially flush with the surface portion and said ledge.

21. A slat assembly as set forth in claim 19 wherein said outer surface overlaps the surface portion.

22. A slat assembly as set forth in claim 18 wherein said seal includes a bottom portion extending along said bottom wall, side sections extending along said side walls, said top, inner and outer surfaces of said side portions of said sealing means further forming cap portions at upper ends of said side walls.

23. A slat assembly operable to be mounted in a longitudinally extending recess in a surface portion of a vehicle, comprising:
a channel member disposed within the recess, said channel member comprising a bottom wall, a pair of side walls extending upwardly from said bottom wall, and ledges extending inwardly from said side walls which terminate to define a channel, said ledges including an article supporting surface and an inner upper surface spaced generally vertically from said article supporting surface and disposed below the surface portion;
a mounting pad disposed between said bottom wall of said channel member and a bottom surface of the recess, wherein said mounting pad has a transverse width less than a transverse width of said bottom wall;
sealing means for sealing a space between the recess and said channel member, said sealing means comprising side portions extending longitudinally and an end portion extending transversely between said side portions at each end thereof, said side portions having an outer surface, an inner surface, and a top surface extending transversely between said outer surface and said inner surface;
wherein said inner surface engages said side wall and extends downwardly and partially therealong and said top surface is substantially flush with the surface portion and said ledge.

24. A slat assembly operable to be mounted in a longitudinally extending recess in a surface portion of a vehicle, comprising:
a channel member disposed within the recess, said channel member comprising a bottom wall, a pair of side walls extending upwardly from said bottom wall, and ledges extending inwardly from said side walls which terminate to define a channel, said ledges including an article supporting surface and an inner upper surface spaced generally vertically from said article supporting surface and disposed above the surface portion;
a mounting pad disposed between said bottom wall of said channel member and a bottom surface of the recess, said mounting pad having a transverse width less than a transverse width of said bottom wall;
sealing means for sealing a space between the recess and said channel member, said sealing means comprising side portions extending longitudinally and an end portion extending transversely between said side portions at each end thereof, said side portions having an outer surface, an inner surface, and an upper surface extending transversely between said outer surface and said inner surface;
wherein said inner surface engages said side wall and extends downwardly and partially therealong and said outer surface overlaps the surface portion.

25. A slat assembly operable to be mounted in a longitudinally extending recess in a surface portion of a vehicle, comprising:
a channel member comprising a bottom wall, a pair of side walls extending upwardly from said bottom wall, and ledges extending inwardly from said side walls which terminate to define a channel, said ledges including an article supporting surface and an inner upper surface spaced generally vertically from said article supporting surface and being flush with the surface portion;
sealing means for sealing a space between the recess and said channel member;
said sealing means comprising a bottom portion extending along said bottom wall, side sections extending along said side walls, and cap portions at an upper end of said side walls, said cap portions including a top surface, inner surface and outer surface; and
wherein said outer surface overlaps the surface portion and said inner surface overlaps said ledge.

* * * * *

UNITED STATES PATENT AND TRADEMARK OFFICE
CERTIFICATE OF CORRECTION

PATENT NO. : 5,090,605
DATED : February 25, 1992
INVENTOR(S) : John S. Cucheran It is certified that error appears in the above-identified patent and that said Letters Patent is hereby corrected as shown below:

Column 1, Line 1, After the title and before "Summary" insert the following:

--BACKGROUND OF THE INVENTION

1. Field of the Invention

The present invention relates generally to an article carrier for vehicles, and more particularly, to a slat assembly for an article carrier on an automotive vehicle.

2. Description of the Related Art

Vehicle article carriers frequently employ two separate subassemblies or portions: a rectangular framework which surrounds the load to be carried and a plurality of slats which rest on the roof or other vehicle body portion and carries the weight of the load. In such constructions, the framework and the slats are often secured to the vehicle body independently of one another. In still another vehicle article carrier or luggage carrier, a crossbar replaces the framework as a means for confining the articles upon the slats.

In prior U.S. Patent 4,182, 471, an article carrier for vehicles was disclosed having slats extending above the vehicle body surface and

UNITED STATES PATENT AND TRADEMARK OFFICE
CERTIFICATE OF CORRECTION

PATENT NO. : 5,090,605          Page 2 of 3

DATED : February 25, 1992

INVENTOR(S) : John S. Cucheran

It is certified that error appears in the above-identified patent and that said Letters Patent is hereby corrected as shown below:

crossbars which can be adjusted on the slats. The crossbars are easily removed, interchanged or adjusted in position on the slats in accordance with the needs of the user. This construction has achieved significant commercial success. Nevertheless, a need exists to provide a slat which is more aesthetically pleasing and easy to assemble. Therefore, it is believed that a need exists for a slat which does not extend above the vehicle body surface. More specifically, it is believed that a need exists for a slat which can be assembled and mounted substantially flush with the vehicle body surface.--

Column 2, line 21, "he" should be --be--;

Column 2, line 39, "Wall" should be --wall--;

UNITED STATES PATENT AND TRADEMARK OFFICE
CERTIFICATE OF CORRECTION

PATENT NO. : 5,090,605
DATED : 02-25-1992
INVENTOR(S) : John S. Cucheran

It is certified that error appears in the above-indentified patent and that said Letters Patent is hereby corrected as shown below:

Column 2, line 39, "Out" should read --out--.

Signed and Sealed this

Ninth Day of November, 1993

Attest:

BRUCE LEHMAN

Attesting Officer     Commissioner of Patents and Trademarks